Figure 1:
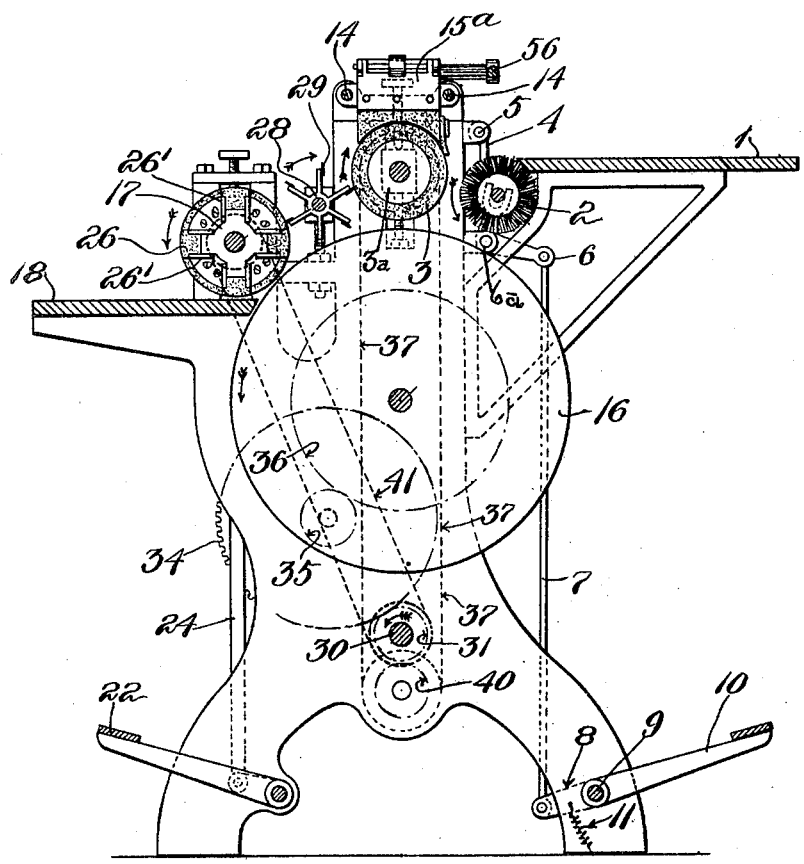

No. 681,651. Patented Aug. 27, 1901.
T. DAWSON.
LEATHER SEASONING MACHINE.
(Application filed May 22, 1901.)
(No Model.) 3 Sheets—Sheet 1.

Witnesses:
Inventor:
Thomas Dawson
by
Ira L. Fish Attorney

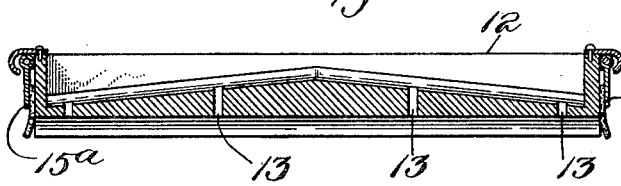
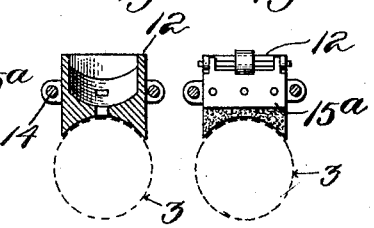
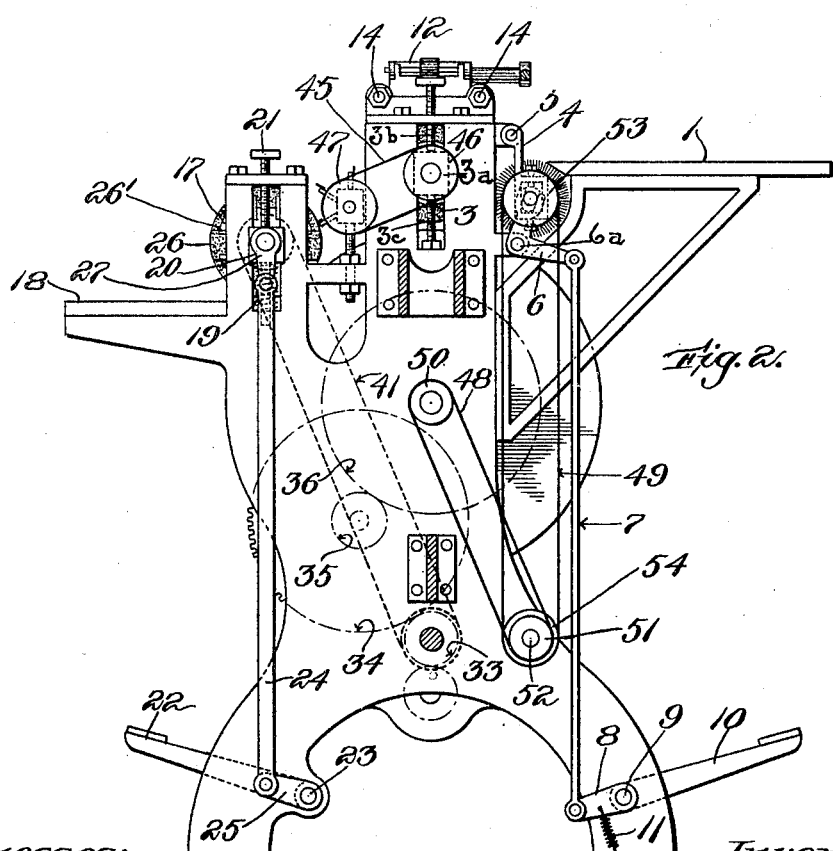

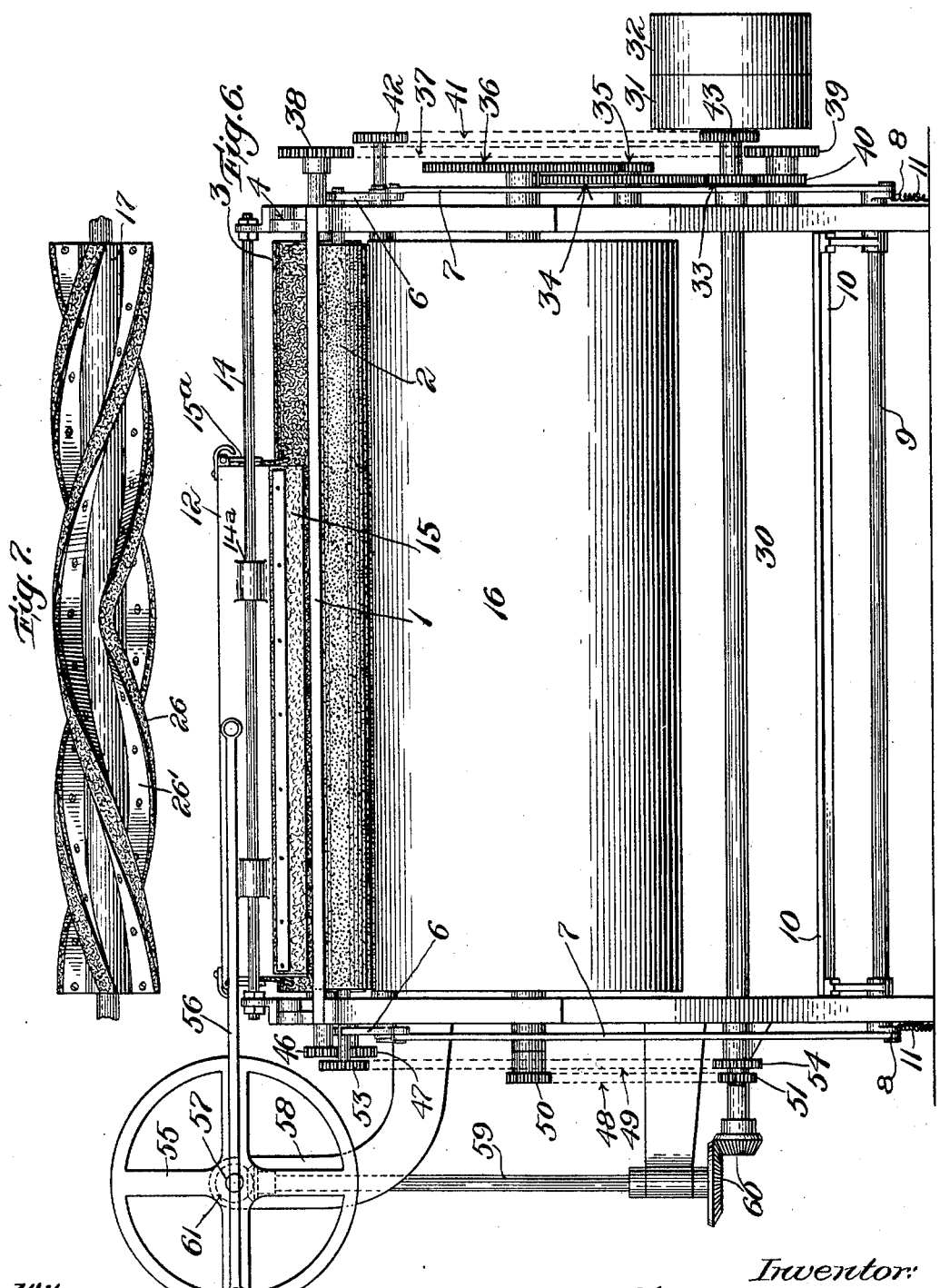

UNITED STATES PATENT OFFICE.

THOMAS DAWSON, OF SALEM, MASSACHUSETTS, ASSIGNOR OF THREE-FOURTHS TO WILLIAM L. WOOD, OF BEVERLY, MASSACHUSETTS.

LEATHER-SEASONING MACHINE.

SPECIFICATION forming part of Letters Patent No. 681,651, dated August 27, 1901.

Application filed May 22, 1901. Serial No. 61,365. (No model.)

*To all whom it may concern:*

Be it known that I, THOMAS DAWSON, of Salem, in the county of Essex and State of Massachusetts, have invented certain new and useful Improvements in Seasoning-Machines, of which the following is a specification.

The invention relates to the treatment of hides or skins in the seasoning or filling operation. In the seasoning process or operation a seasoning or filling liquor is applied to the outer surface of the skin and is thorougly rubbed into all parts thereof, the skin being drawn or spread outward from the center toward the edges and the surface being smoothed and finished by suitable rubbing. During the rubbing in of the seasoning liquor it is important that the skin be so supported that it will not be folded or bunched up by the rubbing device, and it is also important that the seasoning liquor should be evenly applied to all parts of the outer surface of the skin and should be thoroughly rubbed and worked into the leather at all points. The skin should also be stretched or spread outward from the center uniformly and without wrinkling or forming folds or ridges therein.

The object of the present invention is to provide a machine by which the skins may be treated in the manner above set forth and by which the seasoning process may be rapidly and efficiently performed.

To these ends the invention comprises a feeding-roll and a coöperating roll for applying the seasoning liquor to the outer surface of the skin and rubbing said liquor into the skin, and also comprises a spreading-roll, which acts to rub the surface of the skin and to spread or stretch the skin outward toward the edges.

The invention also comprises certain other features and combinations, which will be more fully explained hereinafter and set forth in the claims.

The feeding-roll engages the flesh side of the skins, and its surface is of such a character that it will properly regulate the forward movement of a skin as its outer surface is acted upon by the distributing-roll and will also yield to compensate for variations in the thickness of different parts of a skin, so that all parts of the skin are properly presented to the action of the distributing-roll. The surface of the feeding-roll should also be of such a character that the skin may creep or move forward under the action of the distributing-roll, so that folds or ridges will not be formed therein by the rubbing action of the distributing-roll, as would be likely to happen if the skin clung closely to the surface during the rubbing or no provision were made for a creeping of the skin or a more rapid movement than the normal travel of the feeding-surface. I have found that a feeding-roll having a brush-like surface formed of radially-extending bristles coöperates with the distributing-roll in a satisfactory manner and prefer to employ such a roll, although other material or forms of yielding surface which will properly coöperate with the distributing-roll may be employed if found desirable. The distributing-roll runs at a higher rate of speed than the feeding-roll and is provided with an absorbent covering—such as felt, for instance—which carries the seasoning liquor and applies said liquor to the skin and rubs it into the same as the skin is slowly fed between the feeding-roll and the distributing-roll. The distributing-roll is preferably located back of the feeding-roll and coöperates with the rear side of the feeding-roll, so that the skin passes downward between said rolls, as with this arrangement any surplus liquor which presses out of the distributing-roll by reason of the pressure between the rolls as the skin is passing between them lies in the V-shaped trough formed at the meeting of the skin and distributing-roll and is rubbed and worked into the skin. After the skin has been acted upon by the distributing-roll it is acted upon by a spreading-roll having spreading-surfaces arranged thereon in spirals extending in reverse directions from the center of the roll, which surfaces act to rub the outer surface of the skin and to spread or stretch the skin from the center toward the edges. The skin is directed to and supported against this roll by a large drum below the feeding and distributing rolls and arranged to support said skin while it is passing to the spreading-roll and during the action thereof.

The various features of the invention will be better understood by referring to a machine embodying said features, and in the accompanying drawings I have therefore illustrated a machine in which the various features of the invention are embodied in their preferred forms.

In the drawings, Figure 1 is a sectional elevation, the plane of the section being just inside the left end of the frame. Fig. 2 is an elevation showing the right-hand end of the machine with certain brackets broken away. Figs. 3, 4, and 5 are details of the distributing-trough. Fig. 6 is a front elevation of the machine. Fig. 7 is a detail of the spreading-roll.

In the construction shown the skins are fed by an attendant at the front of the machine from a table 1 between the feed-roll 2 and the distributing-roll 3. The distributing-roll 3 is mounted in bearings $3^a$, adjustably held in slots in the frame by screws $3^b$ $3^c$. The feed-roll is located at the rear end of the table and is mounted for movement to and from the distributing-roll, being supported in bearings in arms 4, which are pivoted at 5 to the frame. The roll 2 is normally out of contact with the roll 3, so that the end of the skin may be readily introduced between said rolls. The roll 2 may be moved toward the roll 3 to press the skin against said roll through bell-crank levers pivoted at $6^a$ to the frame, the upper ends of which straddle the roll-shaft and the lower ends of which are connected by links 7 with arms 8, secured to a rock-shaft 9, operated by a treadle 10. A spring 11 acts to hold the parts in their normal position, and by forcing down the treadle the operator may press the roll 2 against the roll 3 with the desired pressure and may regulate such pressure to produce the proper operation. The roll 2 has a yielding brush-like surface formed by radially-extending bristles. This surface clings to the flesh side of the skin sufficiently to effect the proper feed of the skin and presses all parts of the skin evenly against the roll 3 while allowing the skin to creep or advance upon the roll 2, if necessary, under the action of the roller 3 to avoid the formation of folds or ridges in the skin. The distributing-roll 3 is provided with a covering of absorbent material, such as felt, which carries the seasoning liquor and applies the same to the outer surface of the skin. This roll is driven at a higher speed than the roll 2, so that in applying the seasoning liquor it also slips or rubs over the surface of the skin, thus rubbing and working the liquor into the same. The roll 3 is located in the rear of the roll 2, and the liquor which is squeezed out of the roll 3 by the pressure of the skin against the roll lies in the angle between the skin and the surface of roll 3 and is worked into the skin by the roll. The seasoning liquor is fed to the distributing-roll in the construction shown by a novel form of distributing-trough, which embodies certain features of invention. In a machine of this character the liquor should be evenly distributed to all parts of the roll, including the ends, so that it may be evenly applied throughout the surface of the skin, to the edges as well as to the middle portion, and devices are therefore employed for spreading the liquor toward the ends of the distributing-roll. The distributing-trough 12 is located above and out of contact with the distributing-roll and is provided with perforations 13, through which the liquor may pass onto the surface of the roll. The trough is mounted on guides 14, which pass through lugs $14^a$ on the sides of the trough, and the trough is reciprocated longitudinally of the roll during the operation of the machine, thus delivering the liquor evenly to the roll as it revolves below the perforations in the trough. In order to spread the liquor and assist in the even distribution thereof, the front side of the trough carries a wiper 15, preferably of felt or other absorbent material, which bears against the surface of roll 3. The means for spreading the liquor toward the ends of the roll consist of wipers $15^a$, pivoted to the ends of the reciprocating trough and provided with engaging ends which conform to the surface of the roll and are preferably formed of absorbent material, such as felt. When one of these wipers travels along the surface of the roll toward the center of the roll, it is swung outward by its engagement with the roll and bears but lightly against the roll; but when the motion of the trough is reversed and the wiper travels toward the end of the roll it is swung inward by the engagement with the roll toward the end of the trough, so that it presses on the roll and works the liquor toward the end of said roll. The liquor may be supplied to the trough at a suitable rate from a tank over the trough, and the trough is preferably provided with a bottom which is inclined from the middle of the trough toward each end. As the trough reciprocates the supply of liquor falls first on one incline and then on the other and flows down said inclines and through the perforations, and thus is evenly distributed throughout the length of the roll without waste. As the forward end of the skin passes from between the rolls 2 and 3 it is received upon the surface of a revolving drum 16, which preferably has a surface speed somewhat in excess of the feeding-roll and which supports said skin and carries it forward to the spreading-roll 17. The spreading-roll is normally out of contact with the drum and out of contact with the delivery-table 18, as indicated in Fig. 1, being held in its raised position by springs 19, which yieldingly support the bearing-boxes 20 against adjustable stop-screws 21. After the end of the skin has passed under the roll 17 into position to be grasped by an attendant at the rear of the machine the roll is pressed down upon the skin with the proper pressure through a treadle 22, connected with a rock-shaft 23, which is connected with the roll through links 24, the lower ends of which are pivoted to arms 25, secured to the rock-shaft, and the upper ends of which are pivoted to arms 27, loosely hung on the shaft of the roll 17. By pressing on the treadle the attendant may force the roll 17 toward the drum and subject the skin to the proper pressure. It is preferred to so locate the delivery-table that the roll 17 will also bear upon the skin as it passes over said table, so that the roll will act upon the skin at two different points in its length. The rubbing-surfaces of the spreading-roll are formed by strips 26 of suitable material, preferably felt, which extend from the center of the roll in reverse spirals. There may be any suitable number of these spiral strips arranged about the roll, there being four in the construction shown, and the strips may be held upon the roll between properly-arranged clamping-plates 26', as shown. The roll is driven at a high rate of speed, and as the skin passes under the roll the spiral rubbing-surfaces act to rub and finish the surface of the skin, and also to stretch or spread the skin from the center outward. The roll may be driven in either direction, but is preferably driven in a direction opposite to the movement of the skin, in which case the skin will be stretched outward toward the edges and toward the rear end of the skin. In case the skin does not adhere to the drum sufficiently to resist the backward action of the spreading-roll when said roll is driven in a direction opposite to the movement of the drum, the feeding action of the drum may be assisted by the operator who grasps the forward end of the skin. I have found that a better finish is given to the skin if the surface of the skin is aerated between the action of the distributing-roll thereon and the action of the spreading-roll, and I therefore prefer to provide a device for forcing a current of air against the skin between these two operations. In the construction shown this device is in the form of a fan-wheel 28, located between the roll 3 and the roll 17, which forces air upon the outer surface of the skin as it passes over the drum 16. In some cases the skin may adhere somewhat to the surface of the roll 3, so that the front end of the skin tends to follow the surface of said roll, and I therefore prefer to provide the machine with clearing devices, which are in the nature of safety devices, for preventing the skin from adhering to the surface of the roll 3. In the construction shown these devices consist of engaging strips 29, preferably of flexible material, secured to the blades of the fan-wheel 28 and arranged to engage the surface of roll 3 and strip the end of the skin therefrom should the skin adhere thereto.

It will be found desirable in most cases in treating the skins to pass them twice through the machine and to reverse the skins—that is, turn them end for end in passing them through the second time. In this way the skins will be spread and stretched from the center outward and toward both ends in passing through the machine twice.

The form of mechanism employed for driving the various parts is not material. The machine shown is driven through a driving-shaft 30, carrying a tight pulley 31 and loose pulley 32. The drum 16 is connected with the driving-shaft through a pinion 33, secured to the shaft, which engages a gear 34, connected with a pinion 35, which meshes with a pinion 36 on the drum-shaft. The roll 3 is driven from a chain 37, which passes over a sprocket-wheel 38 on the roll-shaft and a sprocket-wheel 39, connected with a pinion 40, which engages the pinion 33 on the driving-shaft. The roll 17 is driven through a chain 41, which passes over a sprocket-wheel 42 on the roll-shaft and a sprocket-wheel 43, secured to the driving-shaft. In case the roll 17 is to be driven in the same direction as the drum a crossed chain may be used. The fan-wheel 28 is driven through a chain 45, passing over a sprocket-wheel 46, secured to the shaft of roll 3, and a sprocket-wheel 47, secured to the fan-wheel shaft. The roll 2 is driven from the drum-shaft through chains 48 and 49, the chain 48 passing over a sprocket-wheel 50 on the drum-shaft and a sprocket-wheel 51, mounted on a stud 52, and chain 49, passing over a sprocket-wheel 53, secured to the roll-shaft, and a sprocket-wheel 54, secured to the sprocket-wheel 51. The trough 12 is guided upon rods 14, extending transversely of the machine, and is reciprocated through a crank-wheel 55, connected with said trough by a connecting-rod 56. The wheel 55 is secured to a shaft 57, mounted in a bracket 58 and driven from the driving-shaft through a vertical shaft 59, which is connected with the driving-shaft by bevel-gears 60 and with the shaft 57 by bevel-gears 61.

What I claim, and desire to secure by Letters Patent, is—

1. In a seasoning-machine the combination of a rotary feeding-roll having a yielding supporting-surface, a distributing-roll rotating at a higher speed and coöperating with the feeding-roll to apply and rub in the seasoning liquor as the skin is advanced by said rolls, means for driving said feeding-roll, and means for driving said distributing-roll at a higher surface speed, substantially as described.

2. In a seasoning-machine the combination of a rotary feeding-roll having a brush-like supporting-surface, a distributing-roll rotating at a higher speed and coöperating with said feeding-roll to apply and rub in the seasoning liquor as the skin is advanced by said rolls, means for driving said feeding-roll, and means for driving said distributing-roll at a higher surface speed, substantially as described.

3. In a seasoning-machine the combination of a rotary feeding-roll having a supporting-surface formed of radially-extending bristles, a distributing-roll rotating at a higher speed and coöperating with said feeding-roll to apply and rub in the seasoning liquor as the skin is advanced by said rolls, means for driving said feeding-roll, and means for driving said distributing-roll at a higher surface speed, substantially as described.

4. In a seasoning-machine the combination of a rotary feeding-roll having a brush-like surface, an absorbent distributing-roll rotating at a higher speed and coöperating with said feeding-roll to apply and rub in the seasoning liquor as the skin is advanced by said rolls, means for driving said feeding-roll, and means for driving said distributing-roll at a higher surface speed, substantially as described.

5. In a seasoning-machine the combination of a rotary feeding-roll having a yielding surface, an absorbent distributing-roll arranged in the rear of said feeding-roll and rotating at a higher rate of speed, means for driving said feeding-roll, and means for driving said distributing-roll at a higher surface speed, substantially as described.

6. In a seasoning-machine the combination of a rotary feeding-roll, a coöperating distributing-roll, a spreading and rubbing roll, and a rotary drum arranged to support the skin as it comes from the feeding and distributing rolls, and while it is being acted upon by the spreading and rubbing roll, substantially as described.

7. In a seasoning-machine the combination of a rotary feeding-roll, a coöperating distributing-roll, means for rotating the distributing-roll at a higher surface speed than the feeding-roll, a spreading and rubbing roll rotating in the opposite direction, a coöperating drum arranged to direct the skin to the spreading and rubbing roll and to support the same while it is being acted upon by said roll, substantially as described.

8. In a seasoning-machine the combination of a rotary feeding-roll, a coöperating distributing-roll, a spreading and rubbing roll, means to direct the skin to the spreading and rubbing roll and to support the same while being acted upon by said roll, and an aerating device between said distributing-roll and spreading and rubbing roll, substantially as described.

9. In a seasoning-machine the combination of a rotary feeding-roll, a coöperating distributing-roll, a spreading and rubbing roll, means for directing the skin to the spreading and rubbing roll and to support the same while being acted upon by said roll, and a device for preventing the skin from adhering to the distributing-roll, substantially as described.

10. In a seasoning-machine the combination of a rotary feeding-roll, a coöperating distributing-roll, a spreading and rubbing roll, means for directing the skin to the spreading and rubbing roll and to support the same while being acted upon by said roll, and a stripping device for preventing the skin from adhering to the distributing-roll, substantially as described.

11. In a seasoning-machine the combination with a distributing-roll, of a distributing-trough above the same provided with perforations and mechanism for reciprocating said trough longitudinally of said roll, substantially as described.

12. In a seasoning-machine the combination, with a distributing-roll of a distributing-trough above the same provided with a bottom inclined from the center toward both ends, perforations through said bottom, and mechanism for reciprocating said trough longitudinally of said roll, substantially as described.

13. In a seasoning-machine the combination with a distributing-roll, of a trough above the same provided with perforations, mechanism for reciprocating said trough longitudinally of said roll, and spreaders on the ends of said trough for spreading the liquor toward the ends of the roll, substantially as described.

14. In a seasoning-machine the combination with a distributing-roll, of a distributing-trough above the same provided with perforations, and spreaders pivoted to the ends of the trough substantially as described.

15. In a seasoning-machine the combination with a distributing-roll, of a distributing-trough above the same provided with perforations, and a spreader on the front side of said trough engaging said roll, substantially as described.

In testimony whereof I have affixed my signature in presence of two witnesses.

THOMAS DAWSON.

Witnesses:
SAMUEL H. STONE,
GEORGIE A. STONE.